United States Patent Office 3,562,958
Patented Feb. 16, 1971

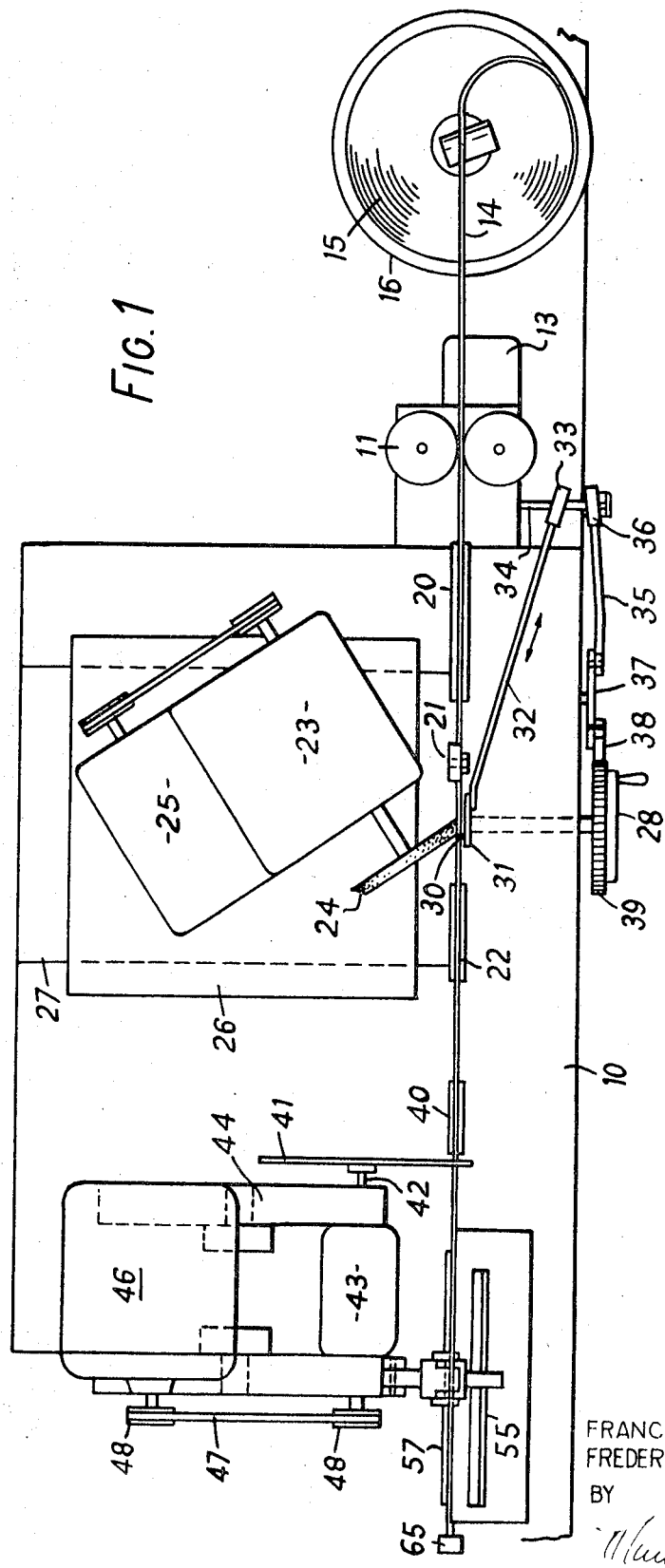
Feb. 16, 1971  F. W. MARTIN ETAL  3,562,958
MACHINE FOR MAKING CUTTING BLADES
Filed Feb. 4, 1969  3 Sheets-Sheet 1
INVENTORS
FRANCIS WILLIAM MARTI
FREDERICK CHARLES WILCO
BY
ATTORNEY

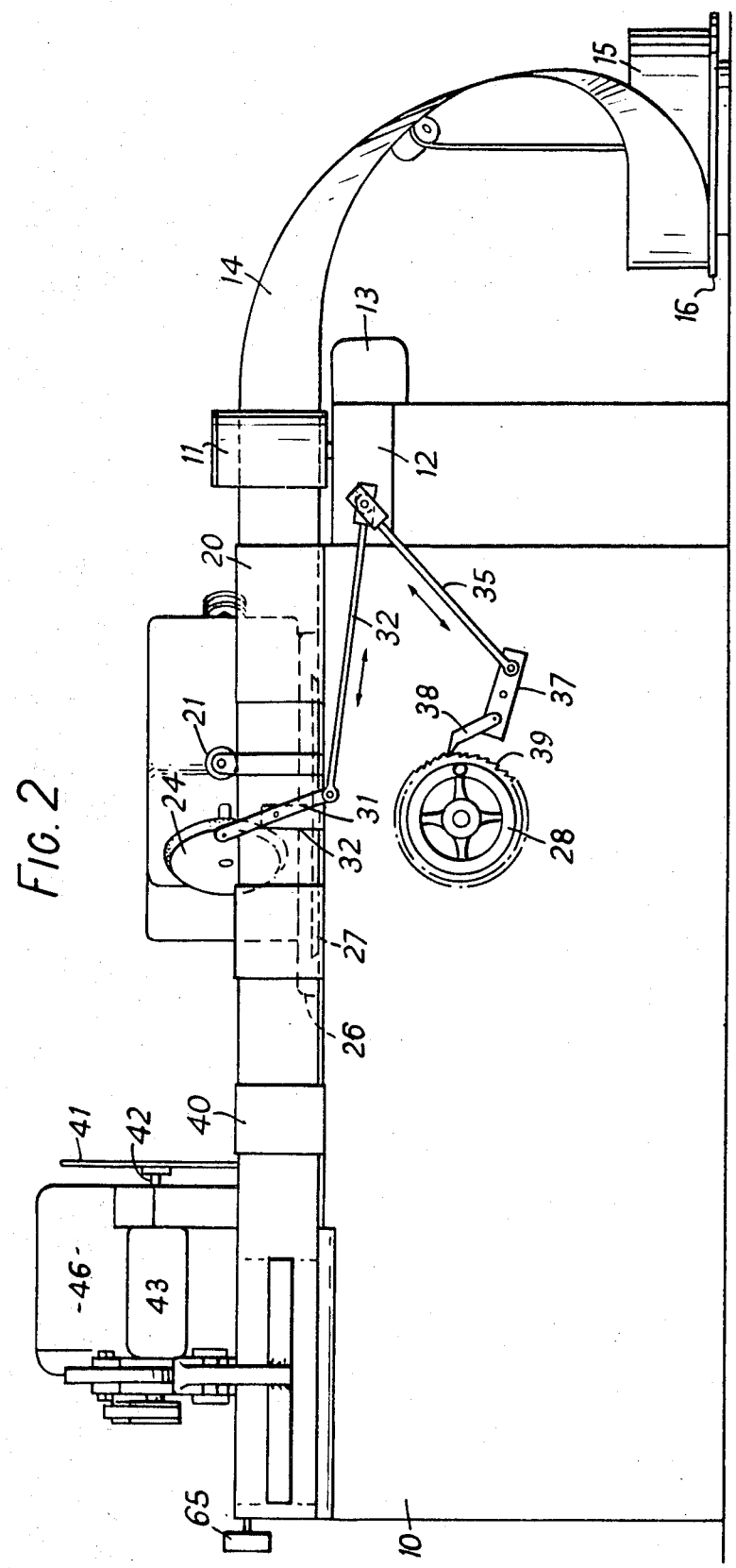

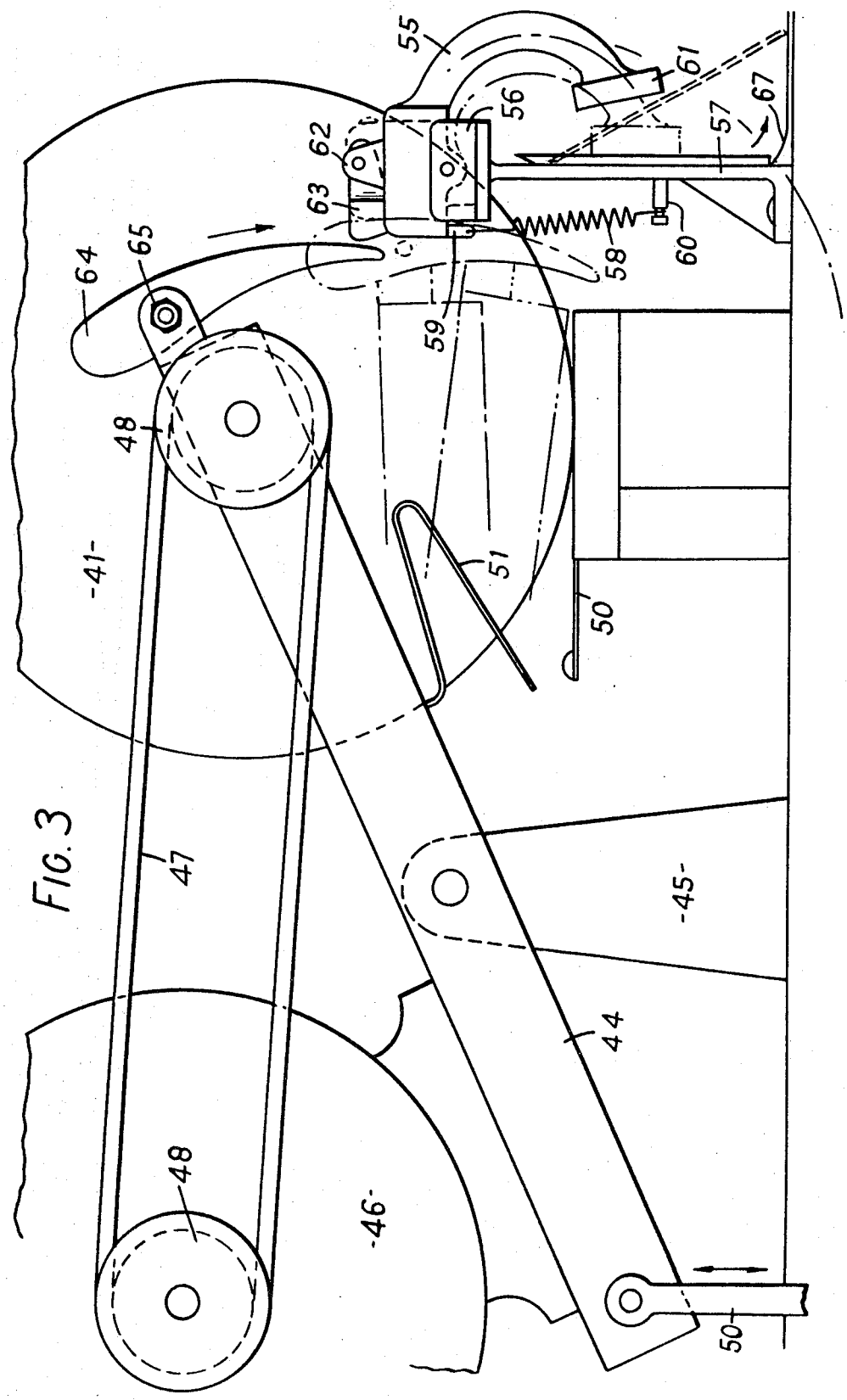

3,562,958
MACHINE FOR MAKING CUTTING BLADES
Francis William Martin and Frederick Charles Wilcox, Andover, England, assignors to AMF Incorporated, New York, N.Y., a corporation of New Jersey
Filed Feb. 4, 1969, Ser. No. 796,515
Int. Cl. B24b 7/00, 9/00
U.S. Cl. 51—3
16 Claims

ABSTRACT OF THE DISCLOSURE

A machine having a first grinding wheel for providing a cutting edge on strip steel and a second grinding wheel for parting off a predetermined length of strip having said cutting edge.

BACKGROUND OF THE INVENTION

This invention relates to a machine for making cutting blades particularly but not solely for use in tobacco cutting machines where the blade is required in the form of a flat rectangular plate ground with a cutting edge along one longitudinal edge.

STATEMENT OF THE INVENTION

According to the invention it is provided in lengths or in coil form, the provision of (a) means for conveying the strip along a predetermined path past a grinding position, (b) a first grinding wheel adjustably mounted on the machine and arranged to provide a cutting edge on a longitudinal edge of the strip as it is conveyed past said grinding position, (c) means for stopping the movement of the strip after a predetermined length of strip has arrived at a parting off position, (d) clamping means for holding the strip during parting off, and (e) a second grinding wheel movable into the path of said strip for parting off the predetermined length of strip.

BRIEF DESCRIPTION OF THE DRAWINGS

A constructional form of the invention will now be described by way of example with reference to the accompanying drawings in which:

FIG. 1 is a plan view of the cutting blade machine only those features pertinent to the present invention being shown, FIG. 2 is a front elevation of the machine shown in FIG. 1, and FIG. 3 is part side view of the machine on an enlarged scale and showing the clamping device and parting off wheel.

DESCRIPTION OF THE PREFERRED EMBODIMENT

The machine shown in the drawings has been adapted for the purpose of the present invention from a conventional grinder having the usual slideways and traversing saddle. The base 10 carries at one end thereof a pair of pinch rollers 11 driven through reduction gearing 12 from a motor 13. The pinch rollers serve to draw off the strip 14 from the coil 15 mounted on a rotatable base 16.

The strip driven by the rollers 11 is conveyed between a first pair of guide plates 20 and beneath a guide roller 21 to a grinding position and between a further pair of guide plates 22. At the grinding position there is provided a grinding head 23 comprising a bevelled grinding wheel 24 carried in a bearing, which head together with a motor 25 is mounted in an adjustably rotatable manner on a saddle 26 movable on a traversing slideway 27. The saddle is movable in the usual manner by means of a handle 28.

The head is set at an angle of 45° and with a 45° bevel on the grinding wheel 24 the latter presents an edge parallel to the strip. A diamond facing tool 30 is mounted at one end of a lever 31 which is pivotally attached to a bracket 32 upstanding from the base 10.

To the other end of the lever 31 there is connected one end of a connecting rod 32, the other end of which is coupled by means of a universal and eccentirc joint 33 to a shaft 34 driven from the reduction gearing 12.

Also driven by the shaft 34 is a connecting rod 35 coupled to the shaft by way of a further universal and eccentric joint 36. The connecting rod 35 is pivotally connected to a pivoted lever 37 at one end, the other end carrying a pawl 38 which engages a ratchet 39 fixed to rotate with the handle 28.

Rotation of the shaft 34 causes the rods 32 and 35 to be reciprocated substantially axially thereof so that the levers 31 and 37 oscillate whereby the wheel 24 is dressed simultaneously with the step-by-step advance of the wheel towards the strip. The wheel is continuously dressed by the oscillating diamond tool so that the set distance of the wheel from the strip is always maintained even if the advance overcompensates for the wear of the wheel.

The ground strip passes along a straight path and between further guide plates 40 to a parting off position. Here there is provided a parting off grinding wheel 41 carried on a shaft 42 mounted in a bearing journal 43. The latter is carried on arms 44 (see FIG. 3) pivotally mounted on brackets 45 attached to the base. The arms carry the drive motor 46 for the wheel 41, the drive being effected by a belt 47 and pulleys 48. Parting off takes place when the strip has ceased its moves as explained later.

The arms carrying the wheel 41 can be rocked for the purpose of parting off by means of a connecting rod 50 which has a screw connection (not shown) with a reversible motor (not shown) mounted on the base close to the foot thereof at the rear of the machine. A universal joint is provided between the screw connection and the shaft of the motor. When motor is rotated in one direction the screw portion of the connection causes the connecting rod to move upwardly and rock the arms so that the wheel 41 effects parting off. The motor is reversed when at the termination of the parting off stroke a microswitch 50 is engaged by a contact 51 on the arm 44.

During parting off the strip to be cut off is held by a clamping arm 55 which is pivotally mounted in a bracket 56 in a guide plate 57. The arm is spring loaded to a normally nonclamping position, a spring 58 being connected between a lug 59 on the arm 55 and a stub 60.

Above the pivoting position of the clamping arm 55 there are provided upstanding brackets 62 which carry a pivotal abutment piece 63. The latter is engageable by a nose 64 adjustably mounted by means of a slot and screw arrangement on brackets 65 extending from the bearing journal 43. As the arms 44 are rocked the nose 64 engages the abutment piece 63 pushing the latter down and to the right as viewed in FIG. 3. The clamping arm pivots so that its flat end member 61 engages and holds the strip piece to be parted off. As soon as the nose has passed the abutment 63 the clamping arm is released which returns to its rest position under the action of the spring 58. When the wheel moves upwards after the cut has been made the nose causes the abutment piece to pivot upwardly so that the latter drags along the surface of the nose so that no further pivoting of the clamping arm takes place.

A cutting blade is therefore made in the following manner:

The motors 13 and 25 are started and the strip is driven by the pinch rollers past the grinding position where it reaches a bevel grinding along one edge. The strip continues to travel in a straight path through the guide plates until the leading edge of the strip abuts the arm of a microswitch 65 whereupon the motors 13 and 25 are switched off and the motor 46 and the motor effecting rocking of the grinding wheel 41 are switched on.

The parting off takes place with simultaneous clamping of the strip. As the clamping arm releases the strip now cut off the latter drops down into a horizontal position for removal by sliding down the curved ramp 67.

We claim:

1. In a machine for forming cutting blades from strip steel provided in lengths or in coil form, the provisions of (a) means for conveying the strip along a predetermined path past a grinding position, (b) a first grinding wheel adjustably mounted on the machine and arranged to provide a cutting edge on a longitudinal edge of the strip as it is conveyed past said grinding position, (c) means for stopping the movement of the strip after a predetermined length of strip has arrived at a parting off position, (d) clamping means for holding the strip during parting off, and (e) a second grinding wheel movable into the path of said strip for parting off the predetermined length of strip.

2. A machine according to claim 1, in which the conveying means are formed by a pair of pinch rollers driven through a reduction gear by a motor.

3. A machine according to claim 1, in which first and second guide means are provided, along the predetermined path, one on each side of the grinding position.

4. A machine according to claim 1, in which retaining means in the form of a roller is provided in the region of the grinding position to prevent any tendency of the strip to rise.

5. A machine according to claim 1, in which the first grinding wheel is mounted in a grinding head, which together with a motor for driving said first grinding wheel is mounted in an adjustable manner on a saddle movable on a slideway positioned transversely of the predetermined path.

6. A machine according to claim 5, in which the head is set at an angle of 45° to the predetermined path and the first grinding is bevelled at 45°, whereby the latter presents an edge parallel to the strip.

7. A machine according to claim 6, in which a facing tool is mounted at one end of a lever which is pivotally supported between its ends on the machine, said lever being oscillated by a convecting rod driven by an eccentric rotater on a shaft, a further eccentric on the shaft effecting oscillation of a further lever which serves to drive, via a ratchet device, means for effecting travel of the saddle, whereby as the facing tool faces the bevelled grinding wheel simultaneous movement of the latter towards the strip is effected.

8. A machine according to claim 7, in which the second grinding wheel is carried on a pivotally mounted framework and is driven by a motor also carried by said framework.

9. A machine according to claim 8, in which the second grinding wheel is movable unto said path for effecting parting off, by a connecting link driven via a screw coupling by a reversible motor.

10. A machine according to claim 8, in which said clamping means is arranged to hold a predetermined portion of the ground strip during parting off, said further grinding wheel being arranged to part off the predetermined length held by the clamping means.

11. A machine according to claim 10, in which an upstanding guide plate is provided against which the strip to be cut off is clamped, said clamping means being pivotally mounted in said guide plate.

12. A machine according to claim 11, in which the clamping means is an arm which is spring loaded to a normally non-clamping position.

13. A machine according to claim 11, in which a nose is provided on said framework, which nose is engageable with a projection on said clamping means when the second grinding wheel is effecting parting off, whereby the clamping means is moved into a clamping position against the strip.

14. A machine according to claim 8, in which electrical control means are provided which include said means for stopping the movement of the strip is a first switch in the path of the strip so as to be engageable thereby to stop the strip conveying means when the predetermined length has arrived at the parting off position.

15. A machine according to claim 14, in which the activation of the first switch also effects switching on of the reversible motor, a second switch for reversing the reversible motor being provided in the path of movement of the framework whereby the second switch is activated as the framework reaches a position where parting off is completed.

16. A machine according to claim 15, in which said first switch also serves to switch on the power to the motor driving the second grinding wheel and said second switch also serves to switch off the power to said motor.

References Cited
UNITED STATES PATENTS
2,290,964  7/1942  Hill _____ 51—80.1A JAMES L. JONES, Jr., Primary Examiner U.S. Cl. X.R.

51—74